United States Patent Office 3,031,435
Patented Apr. 24, 1962

3,031,435
PRODUCTS OF POLYVINYL ALCOHOL COMPOUNDS WITH DIVINYL SULFONE AND PROCESSES FOR PREPARATION THEREOF
Giuliana C. Tesoro, 278 Clinton Ave., Dobbs Ferry, N.Y.
No Drawing. Filed Oct. 5, 1960, Ser. No. 60,562
13 Claims. (Cl. 260—79.3)

This invention relates to the reaction products of synthetic polymers and copolymers containing hydroxyl groups, and particularly of polyvinyl alcohol or its hydroxyl containing derivates with vinyl sulfone compounds containing one or more vinyl sulfone groups corresponding to the formula $$-SO_2CH=CH_2$$

an example of which is divinyl sulfone of the formula $$CH_2=CHSO_2CH=CH_2$$

and methods for preparing the same.

Although polyvinyl alcohol resins, films and fibers have proven to have considerable utility in the textile art, their usefulness for certain purposes has been severely restricted due to the presence of certain objectionable inherent properties. For example, when polyvinyl alcohol resin is used as a sizing material for textile fabrics, it is readily removed in washing. However, by the use of the present invention it has been found that polyvinyl alcohol can be rendered insoluble in hot water by converting it to the novel reaction products described herein. The resulting insolubilized polyvinyl alcohol compounds are thus retained by the textile fabrics and are durable to repeated washing and laundering. Similarly, the usefulness of polyvinyl alcohol fibers is limited by their great sensitivity to water. When exposed to water at elevated temperature (70-80° C.), yarns manufactured from polyvinyl alcohol fibers have a tendency to swell enormously, lose their identity, and form a resinous mass which ultimately dissolves in the hot water medium.

Although there are several methods available for treating polyvinyl alcohol resins, films and fibers, to increase their water resistance, it is known[1] that even after such treatments the products tend to soften, swell and lose strength on exposure to water. There is, therefore, a great need for a chemical modification of polyvinyl alcohol products which will increase their water resistance to a greater degree than presently known methods.

It is, therefore, an object of the invention to provide a method for reacting polyvinyl alcohol resin fibers, yarns, and fabrics with a vinyl sulfone so as to render the same resistant to water.

It is a further object of this invention to provide a method of reacting a vinyl sulfone with a polyvinyl alcohol compound whereby the resulting product is insoluble in water.

It is a further object of this invention to provide a method of reacting a vinyl sulfone with a polyvinyl alcohol compound whereby swelling of the resulting product by water is greatly decreased.

It is a further object of this invention to provide novel reaction products of polyvinyl alcohol compounds with a vinyl sulfone.

It is a further object of this invention to provide fabrics containing durable sizing materials derived from reacting polyvinyl alcohol compounds with a vinyl sulfone.

It is a further object of this invention to provide a method for reacting divinyl sulfone with polyvinyl alcohol resin fibers, yarns and fabrics so as to render the same resistant to water.

These and other objects will be apparent from the description which follows.

The novel process of this invention comprises reacting polyvinyl alcohol products with divinyl sulfone preferably in the presence of water and in the presence of a basic catalyst. The phosphates, carbonates and hydroxides of alkali metals; the alkali earth metal hydroxides; quaternary ammonium hydroxides; and strong bases generally are effective catalysts.

The polyvinyl alcohol resins which can be used as starting materials for preparing the derivatives of this invention are, for example, those marketed under the name of "Gelvatol" by Shawinigan Resins Corp. These resins are derived from polyvinyl acetate by partial or complete hydrolysis and vary in percent residual polyvinyl acetate from about 40% (e.g. Gelvatol 40-10) to 1% or less (e.g. Gelvatol 1-90). These resins can also vary greatly in molecular weight and viscosity. Similarly, the polyvinyl alcohol resins marketed under the name of "Elvanol" by E. I. du Pont de Nemours & Co. can be used. Polyvinyl alcohol fibers, yarns and fabrics (e.g. those marketed under the trade name of "Vinal" by the Air Reduction Chemical Co.) can also be used. The polyvinyl alcohol or polyvinyl alcohol derivative employed must contain a sufficient number of unsubstituted hydroxyl groups to undergo the reaction with divinyl sulfone. About 50% or more of the hydroxyl group present in the vinyl alcohol polymer $$(-CH-CH_2-)_x$$
$$\phantom{(-}|$$
$$\phantom{(-CH-}OH$$

should preferably be free of substituents and thus available for reaction.

Suitable polymers include polyvinyl alcohol; partially saponified polyvinyl alcohol esters; hydroxyl containing polyvinyl acetals and copolymers of vinyl chloride, acrylate esters, acrylonitrile or styrene with vinyl alcohol esters which are partially saponified.

Sulfones which can be used for the insolubilization reaction are compounds containing the vinyl sulfone grouping $CH_2=CHSO_2-$, and correspond to the formula $$CH_2=CHSO_2-Q$$

wherein Q is a monovalent radical which will not vitiate the reactivity of the vinyl radical but can enhance the resulting sulfone compound in its reactivity with the polyvinyl alcohol compounds. For example, when Q is $CH_2=CH$, the resulting divinyl sulfone is particularly effective. Other radicals from which Q can be selected include monovalent organic radicals such as substituted and unsubstituted alkyl, aryl and aralkyl groups. Also included are organic radicals containing one or more vinyl sulfone groupings such as $-A(SO_2CH=CH_2)_n$ where $n$ can be 1 or 2 and A is a polyvalent organic radical consisting of carbon and hydrogen atoms. Examples of Q are: $-C_6H_5$, $-C_6H_4CH_3$, $-CH_2C_6H_5$, $-C_{10}H_{21}$, $$-C_6H_4SO_2CH=CH_2$$

$-CH_2C_6H_4CH_2SO_2CH=CH_2$, $-C_2H_4SO_2CH=CH_2$ and related compounds.

The reaction may be carried out on the resin alone or it may be carried out upon fabric which has been sized with a polyvinyl alcohol. In the latter case, the polyvinyl alcohol is converted to the desired reaction product in situ,

---

[1] Du Pont Technical Bulletin on "Elvanol," second edition, 1959, p. 48, "Insolubilizers."

and the fabric acquires a stiffness which is substantially retained upon washing and ironing.

The amount of divinyl sulfone required for insolubilization of the polyvinyl alcohol depends on the molecular weight, the physico-chemical properties, and free hydroxyl group content of the polymer. Amounts of 2% to 60% based on the weight of polymer are effective.

The amount of alkaline catalyst required can also be varied within wide limits, and depends on the specific base which is selected as a catalyst, on the time and temperature of reaction, and on the nature of the polymer.

When sodium hydroxide is used for example, the concentration used can be varied between 0.1% and 30%, based on the weight of solution, with the reaction time varying from several hours to a few seconds at room temperature as the concentration of sodium hydroxide is increased.

The reaction temperature can be between 0° and 100° C., with ambient temperatures preferred.

The solvent or dispersion medium used as a carrier for the sulfone compound in treating the polymer can be water or a non-reactive organic compound plus mixtures thereof.

The present invention will be more completely understood by reference to the following examples. In each instance all percentages and parts are by weight unless otherwise specified.

*Example 1*

Seventy grams of the polyvinyl alcohol resin known as Gelvatol 1–90 (a 99% hydrolyzed polyvinyl acetate, product of the Shawinigan Resin Corp.) and 3.3 grams of divinyl sulfone are dissolved in 630 grams of water. A clear solution is obtained, and no reaction takes place between the polyvinyl alcohol and the divinyl sulfone on standing at room temperature. Upon addition of 22 grams of a 40% aqueous solution of sodium hydroxide, formation of an insoluble precipitate begins, and precipitation of the insolubilized resin is complete within 5 minutes. The modified polyvinyl alcohol which precipitates is washed with dilute acetic acid, and then with water. The precipitated resin can also be washed with acetone in order to accelerate drying. A quantitative yield of the resin is obtained in this manner.

The resin does not dissolve upon boiling in water for 10 minutes, while a sample of the polyvinyl alcohol used as starting material dissolves readily in water at 70° C.

*Example 2*

Fifty grams of the polyvinyl alcohol resin known as Gelvatol 40–10 (a 73–77% hydrolyzed polyvinyl acetate, residual polyvinyl acetate 37–52%, product of the Shawinigan Resin Corp.) and 27.2 grams of divinyl sulfone are dissolved in 450 grams of water. A clear solution is obtained. 62.5 grams of a 40% aqueous solution of sodium hydroxide are added. After standing at room temperature for 5 minutes, the precipitated resin is washed with 10% acetic acid, then with water and thereafter dried. The yield is quantitative.

The resin so obtained remains completely undissolved on boiling in water for 10 minutes.

*Example 3*

Samples of yarn manufactured from unmodified polyvinyl alcohol fiber (non-heat treated, yarn size 25/1) are conditioned at 65% RH (relative humidity), impregnated with an aqueous solution containing 100 grams per liter of divinyl sulfone and 5 grams per liter of sodium hydroxide, and passed through the squeeze rolls of a laboratory padder. The pressure of the squeeze rolls is adjusted to give a wet pickup of 75%. The uptake of divinyl sulfone by the yarn is thus 7.5 g. per 100 grams of yarn.

The yarn samples are allowed to stand at room temperature for 10 minutes, 30 minutes and 60 minutes, respectively, washed in dilute acetic acid, then in water, dried and again conditioned at 65% RH. The weight increases obtained are as follows:

| Sample | Reaction Time, minutes | Weight Increase, percent |
|---|---|---|
| Control, NaOH only | | 0.0 |
| 1 | 10 | 1.5 |
| 2 | 30 | 3.0 |
| 3 | 60 | 4.0 |

Determination of moisture regain on these samples shows that the treatment does not affect the moisture regain of the yarn.

| Sample No. | Moisture Regain, percent at 65% RH |
|---|---|
| Untreated yarn | 6.6 |
| Control, NaOH only | 6.6 |
| 1 (Ex. 3) | 6.3 |
| 2 (Ex. 3) | 6.6 |
| 3 (Ex. 3) | 6.6 |

The untreated yarn sample, and the control sample treated with NaOH only, dissolve in water at 70°–80° C., while the treated yarn samples (#1, 2, 3) do not dissolve in water even at the boil.

*Example 4*

A cotton fabric is impregnated on a laboratory padder with a solution containing 6.2% polyvinyl alcohol (Gelvatol 1–90) and 2.3% divinyl sulfone. The wet pickup is 70%. About 4.3 grams of polyvinyl alcohol and 1.6 grams of divinyl sulfone are thus deposited per 100 grams of fabric. The fabric so treated is dried, then passed through a 10% aqueous solution of sodium hydroxide in order to catalyze the insolubilization of the polyvinyl alcohol. After treatment with sodium hydroxide, the fabric is allowed to stand at room temperature for 1 hour, then washed in dilute acetic acid, washed in water and dried.

As a result of the foregoing treatment, the fabric has acquired stiffness and body which remain essentially unchanged through repeated launderings. When the divinyl sulfone is omitted from the treatment, the stiffness imparted by the polyvinyl alcohol treatments is readily lost in washing. This demonstrates that the polyvinyl alcohol is permanently insolubilized on the fabric by the reaction with divinyl sulfone.

Other fabrics besides cotton can be treated in this manner. For example, fabrics manufactured from regenerated cellulose, polyamide, polyester and acrylic fibers can be so treated if a stiff finish which is durable to laundering is desired.

*Example 5*

The procedure of Example 4 is repeated, except that the treating solution contains 4.6 parts of divinyl sulfone and 7.7 parts of polyvinyl alcohol (Elvanol 71–30). After the sodium hydroxide treatment, the fabric is allowed to stand at room temperature for 30 minutes.

As in Example 4, the polyvinyl alcohol is insolubilized in the fabric by the divinyl sulfone as indicated by the stiffness imparted to the fabric and which stiffness was noted to be durable to repeated washing.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the examples and description set forth herein but rather that the claims be construed as encompassing all the features of patentable novelty which reside in the present invention including all features which would be treated as patentable

I claim:
1. A process which comprises reacting a polyvinyl alcohol containing free hydroxyl groups with a vinyl sulfone in the presence of a basic catalyst to produce a reaction product resistant to being dissolved and swelled by water.
2. The process of claim 1 in which the vinyl sulfone has the formula

$$CH_2=CHSO_2Q$$

wherein Q is a member selected from the group consisting of a vinyl radical and of substituted and unsubstituted alkyl, alkenyl, aryl, and alkaryl radicals.
3. The process of claim 1 in which the vinyl sulfone has the formula $$CH_2=CHSO_2-A(SO_2CH=CH_2)_n$$

wherein A is a polyvalent organic radical consisting of carbon and hydrogen atoms and $n$ has a value from 1 to 2.
4. The process of claim 2 wherein Q is a member selected from the group consisting of $$CH_2=CH-,\ -C_6H_5,\ -C_6H_4CH_3,\ -CH_2C_6H_5,$$
$$-C_{10}H_{21},\ -C_6H_4SO_2CH=CH_2,$$
$$-CH_2C_6H_4CH_2SO_2CH=CH_2,\ \text{and}\ C_2H_4SO_2CH=CH_2.$$

5. The process of claim 1 in which the sulfone is divinyl sulfone.
6. A process which comprises reacting a polyvinyl alcohol containing free hydroxyl groups with a vinyl sulfone in the presence of a basic catalyst and water to produce a reaction product resistant to being dissolved and swelled by water, the reaction being carried out at a temperature of a range of about 0° to 100° C. for about two seconds to three hours.
7. A process which comprises reacting a polyvinyl alcohol containing free hydroxyl groups with a vinyl sulfone in the presence of a basic catalyst and water to produce a reaction product resistant to being dissolved and swelled by water, the reaction being carried out at a temperature of a range of about 0° to 100° C. for about two seconds to three hours and wherein the amount of sulfone is 2 to 60% based on the weight of the polyvinyl alcohol compound and the concentration of the basic catalyst is 0.1 to 30% based on the weight of the solution.
8. The product formed by the process of claim 7.
9. A process of treating a fabric which comprises applying thereto a polyvinyl alcohol containing free hydroxyl groups and a vinyl sulfone and then treating with a basic catalyst.
10. A process which comprises sizing a fabric with a polyvinyl alcohol containing free hydroxyl groups and thereafter insolubilizing said alcohol in the fabric by reacting the same with a vinyl sulfone in the presence of a basic catalyst.
11. The process of claim 10 in which the fabric is cotton.
12. The fabric produced by the process of claim 10.
13. The fabric produced by the process of claim 9.

References Cited in the file of this patent
UNITED STATES PATENTS

| | | |
|---|---|---|
| 2,169,250 | Izard | Aug. 15, 1939 |
| 2,505,366 | Schoene | Apr. 25, 1950 |